US008239890B2

(12) United States Patent
Kooman

(10) Patent No.: US 8,239,890 B2
(45) Date of Patent: Aug. 7, 2012

(54) SYSTEMS AND METHODS FOR AUTHORIZING ACCESS TO CONTENT FOR A TELEVISION RECEIVER

(75) Inventor: Christopher Kooman, Englewood, CO (US)

(73) Assignee: Echostar Technologies LLC, Englewood, CO (US)

( * ) Notice: Subject to any disclaimer, the term of this patent is extended or adjusted under 35 U.S.C. 154(b) by 308 days.

(21) Appl. No.: 12/611,699

(22) Filed: Nov. 3, 2009

(65) Prior Publication Data

US 2011/0107378 A1 May 5, 2011

(51) Int. Cl.
*H04N 7/16* (2006.01)
(52) U.S. Cl. ........... 725/27; 725/25; 725/28; 725/29; 725/30; 725/31; 725/133; 725/141; 725/153
(58) Field of Classification Search ........... 725/25, 725/27–31, 133, 141, 153
See application file for complete search history.

(56) References Cited

U.S. PATENT DOCUMENTS

| 2002/0104019 | A1* | 8/2002 | Chatani et al. ............ 713/201 |
| 2003/0028883 | A1* | 2/2003 | Billmaier et al. ........... 725/46 |
| 2003/0084440 | A1* | 5/2003 | Lownes ..................... 725/6 |
| 2003/0097655 | A1* | 5/2003 | Novak ...................... 725/31 |
| 2004/0117269 | A1 | 6/2004 | Karaoguz et al. |
| 2004/0117845 | A1 | 6/2004 | Karaoguz et al. |
| 2004/0210924 | A1* | 10/2004 | Duffield ................... 725/25 |
| 2004/0250274 | A1* | 12/2004 | Genevois .................. 725/31 |
| 2005/0147247 | A1* | 7/2005 | Westberg et al. .......... 380/200 |
| 2005/0210500 | A1* | 9/2005 | Stone ...................... 725/31 |
| 2011/0083141 | A1* | 4/2011 | Westberg et al. .......... 725/31 |

FOREIGN PATENT DOCUMENTS

| EP | 2009919 | 12/2008 |
| WO | WO 2005/091636 | 9/2005 |
| WO | WO 2005/101411 | 10/2005 |

OTHER PUBLICATIONS

"iLok.com Frequently Asked Questions", retrieved from www.iLok.com—FAQ on Oct. 6, 2009, 19 pages.
"Smart card", retrieved from Wikipedia's internet site located at http://en.wikipedia.org/w/index.php?title=Smart_card&printable=yes on Feb. 18, 2010, 12 pages.
International Search Report and Written Opinion dated Jan. 11, 2011, PCT/US2010/055245, 4 pages.

* cited by examiner

*Primary Examiner* — Jason Salce
(74) *Attorney, Agent, or Firm* — Kilpatrick Townsend & Stockton LLP

(57) ABSTRACT

Described herein are techniques for transferring content authorization information between television receivers. Authorization information for content and features associated with a television receiver is securely stored on a portable storage device. The portable storage device may be moved and connected to a different television receiver in order to transfer the authorization information to the different television receiver. The other television receiver accesses information on the portable storage device and allows the user to access the content and features that are authorized on the home television receiver.

20 Claims, 4 Drawing Sheets

SYSTEMS AND METHODS FOR AUTHORIZING ACCESS TO CONTENT FOR A TELEVISION RECEIVER

BACKGROUND

In television distribution systems, such as cable or satellite television distribution systems, content is typically authorized for output by a particular television receiver. Thus, the user is restricted to where they may view their purchased content. This is a problem, because the user may desire to view purchased content at a different location than their television receiver. For example, a user may desire to purchase a pay-per-view (PPV) boxing event on their own account, but may desire to watch the event at their friend's house on a much larger television. However, the user cannot watch their purchased content on a television receiver located at another location in order to effectuate the desired scenario.

BRIEF DESCRIPTION OF THE DRAWINGS

The same number represents the same element or same type of element in all drawings.

DETAILED DESCRIPTION OF THE DRAWINGS

Described herein are systems, methods and apparatus for authorizing access to content and features of a television receiver. More particularly, described herein are techniques for transferring content authorization information between television receivers. Authorization information for content and features associated with a television receiver is securely stored on a portable storage device. The portable storage device may be moved and connected to a different television receiver in order to transfer the authorization information to the different television receiver. The other television receiver accesses information on the portable storage device and allows the user to access the content and features that are authorized on the home television receiver. Thus, a user may view their purchased content at different locations.

At least one embodiment is a television receiver including a network interface that receives programming from a television distribution network. The television receiver further includes an input interface that receives a portable storage device. The portable storage device stores data specifying a portion of the programming authorized for output by a second television receiver. The television receiver further includes a processor operable to access the data stored on the portable storage device, identify the portion of the programming authorized for viewing on the second television receiver based on the data and output the portion of the programming for presentation by a presentation device.

In at least one embodiment, the input interface comprises a universal serial bus (USB) port configured to receive the portable storage device. The portable storage device may comprise a USB flash memory device or the like that communicatively couples to the input interface. The input interface accesses the authorization information stored on the USB flash memory device and the processor utilizes the authorization information to allow a user access to specified content.

Another embodiment comprises a method of operating a video output device. The method includes identifying, in a conditional access module of a first video output device, unauthorized content that the video output device is not entitled to access. The method further includes accessing data, stored on a portable storage device communicatively coupled to the first video output device, the data specifying at least a portion of the unauthorized content that is authorized for output by a second video output device. The method further includes receiving a request, at the first video output device, to access the portion of the unauthorized content and authorizing access to the portion of the unauthorized content based on the data. The method further includes outputting the portion of the unauthorized content for presentation by a presentation device.

Figure 1:
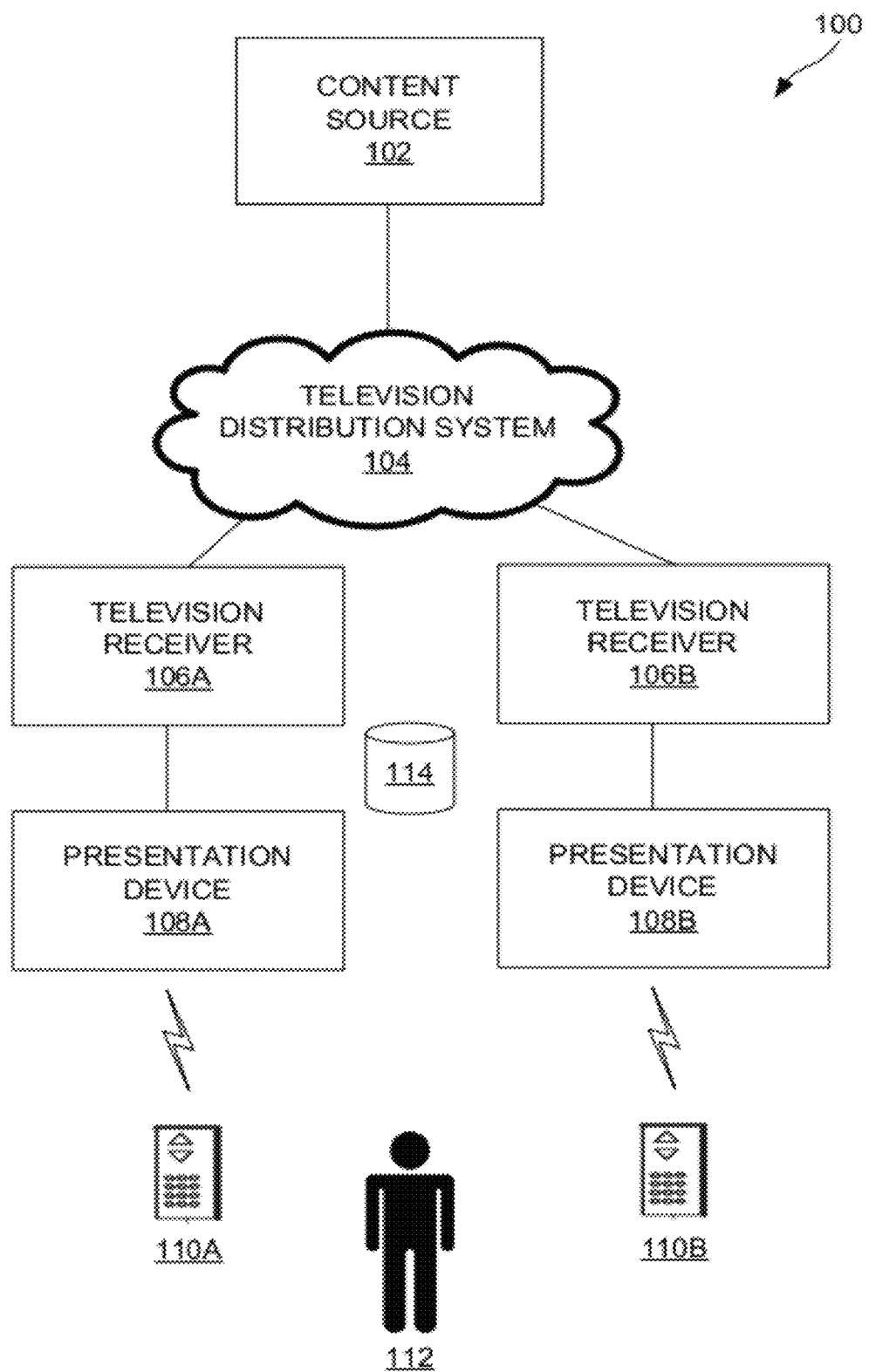
FIG. 1 illustrates an embodiment of a communication network.

FIG. 1 illustrates an embodiment of a communication network 100. The communication network 100 includes a content source 102, a television distribution system 104, television receivers 106A and 106B, presentation devices 108A and 108B, remote controls 110A and 110B and a portable storage device 114. Each of these components will be discussed in greater detail below. The communication network 100 may include other components, elements or devices not illustrated for the sake of brevity.

The content source 102 is operable for receiving, generating and communicating content to one or more television receivers 106A and 106B. The content to be received, processed, outputted and/or communicated may come in any of various forms including, but not limited to, audio, video, data, information, or otherwise. In at least one embodiment, the content source 102 is operable for receiving various forms and types of content from other sources, aggregating the content and transmitting the content to the television receiver 106 through the television distribution system 104. It is to be appreciated that the content source 102 may receive practically any form and/or type of information from one or more sources including streaming television programming, recorded audio or video content, electronic programming guide data and the like.

In at least one embodiment, the content source 102 may also generate and/or initiate transmission of authorization information to the television receivers 106A and/or 106B. For example, the content source 102 may generate information authorizing the television receivers 106A and/or 106B to access particular channels, particular packages of channels, pay-per-view (PPV) content, video-on-demand (VOD) content and the like. Each television receiver 106A stores authorization information specifying what content the television receiver 106A is authorized to output to the presentation device 108A.

The television distribution system 104 is operable to transmit content from the content source 102 to a television receiver 106A and/or 106B. The television distribution system 104 may comprise any type of wired (e.g., cable and fiber) and/or wireless (e.g., cellular, satellite, microwave, and other types of radio frequency) communication medium and any desired network topology (or topologies when multiple mediums are utilized). Exemplary television distribution systems 104 include terrestrial, cable, satellite and internet protocol television distribution systems. In at least one embodiment, the television distribution system 104 broadcasts or multicasts content to a plurality of television receivers 106A and 106B. The television distribution system 104 may also distribute content to a specific addressable television receiver 106A or 106B, such as video-on-demand content and the like. In at least one embodiment, the content source 102 may be embodied as a transmission facility of the television distribution system 104. Exemplary content sources 102 include over-the-air (OTA) terrestrial transmission facilities, cable television distribution head-ends, satellite television uplink centers, broadband or internet servers and the like. The television distribution system 104 may also distribute non-video content, such as electronic programming guide data and the like which is processed by the television receivers 106A and/or 106B.

The television receivers 106A-106B are operable to receive content from the television distribution system 104 and output the received content for presentation by an associated presentation device 108A-108B. In at least one embodiment, the presentation devices 108A-108B are each display devices (e.g., a television) configured to display content to a user 112. A television receiver 106A-106B may receive an audio/video stream in any format (e.g., analog or digital format) and output the audio/video stream for presentation by the associated presentation device 108A-108B. In at least one embodiment, the television receivers 106A-106B are set-top boxes (e.g., a satellite television receiver, cable television receiver, terrestrial television receiver, internet protocol television receiver or any other type of receiver/converter box) or other similar device that processes and provides one or more audio and/or video output streams to a presentation device 108A-108B for presentation to the user 112. The television receivers 106A-106B may be further configured to output menus and other information that allow the user 112 to control the output of audio/video content by the television receiver 106A-106B, view electronic programming guides, set recording timers and the like.

The presentation devices 108A-108B may comprise any type of device capable of receiving and outputting a video signal in any format. Exemplary embodiments of the presentation devices 108A-108B include televisions, computer monitors, liquid crystal display (LCD) screens, touch screens and projectors. A presentation device 108A-108B and a television receiver 106A-106B may be communicatively coupled through any type of wired or wireless interface. For example, the presentation device 108A-108B may be communicatively coupled to the television receiver 106A-108B through a coaxial cable, component or composite video cables, an HDMI cable, a VGA or SVGA cable, a Bluetooth or WiFi wireless connection or the like. In some embodiments, a television receiver 106A-106B and a presentation device 108A-108B may be integrated as a device combining the functionality of a display device and a television receiver, such as a television with integrated CableCard functionality.

A user 112 may control the television receiver 106A-106B using a remote control 110A-110B or other type of data input device compatible with the television receiver 106A-106B. The remote control 110A-110B may comprise any system or apparatus configured to remotely control the output of content by the television receiver 106A-106B. For example, the remote control 110A-110B may include buttons for receiving input from the user 112. In at least one embodiment, the remote control 110A-110B includes a touch pad for receiving input from the user 112. The remote control 110A-110B may minimally include a transmitter, an input device (e.g., a keypad) and a processor or control logic for controlling the operation of the remote control 110A-110B. The remote control 110A-110B may communicate commands to the television receiver 106A-106B requesting to playback content, temporally move through content (e.g., fast-forward or reverse), adjust the volume, access electronic programming guides, set or edit recording timers, edit preferences of the television receiver 106A-106B and the like. In some embodiments, the remote control 110A-110B may additionally be configured to remotely control the presentation device 108A-108B. The remote control 110A-110B may communicate with the television receiver 106A-106B and/or the presentation device 108A-108B through any type of wireless communication medium, such as infrared (IR) signals or radio-frequency (RF) signals.

Communication network 100 also includes a portable storage device 114. The portable storage device 114 is configured to securely store authorization information associated with the television receiver 106A or 106B. The portable storage device 114 may be embodied as any type of data storage device capable of interfacing with either of the television receivers 106A-106B. For example, the portable storage device 114 may be embodied as a USB flash memory device or the like that couples to a USB port of the television receiver 106A-106B. In at least one embodiment, the portable storage device 114 may be embodied as a USB dongle or hardware key. The portable storage device 114 may also interface with the television receivers 106A or 106B using other types of wired or wireless connectors, such as IEEE 1394, WiFi, Bluetooth and the like, depending on desired design criteria.

As described above, in at least one embodiment, each of the television receivers 106A and 106B may store authorization information indicating the content that the particular receiver is authorized to output. The portable storage device 114 may store the same authorization information as stored within the television receiver 106A-106B, a subset of the authorization information stored within the television receiver 106A-106B or data corresponding thereto. For example, the television receiver 106A may generate data summarizing the content authorized for output by the television receiver 106A. The summarization data may then be stored on the portable storage device 114 for utilization by another television receiver 106B to authorize access to the content.

In at least one embodiment, the portable storage device 114 is initially set-up to correspond with the television receiver 106A. For example, the portable storage device 114 may be coupled to and initialized to operate with the television receiver 106A. The television receiver 106A provides authorization information for storage onto the portable storage device 114. For example, the user 112 may order a boxing match PPV event and the television receiver 106A may initiate storage of authorization information for the event onto the connected portable storage device 114.

If the user 112 desires to watch the event at another location, then they connect the portable storage device 114 to the television receiver 106B. In at least one embodiment, the user 112 then requests to access the event through the television receiver 106B using the remote control 110B. The television receiver 106B accesses the authorization information stored on the portable storage device 114 and determines whether to allow the user 112 access to the event on the television receiver 106B based on the authorization information stored on the portable storage device 114. If the television receiver 106B determines that the user 112 is authorized to view the event based on the authorization information stored on the portable storage device, then the television receiver 106B outputs the requested event as requested by the user 112. Thus, the user 112 may view their authorized content in different locations.

Figure 2:
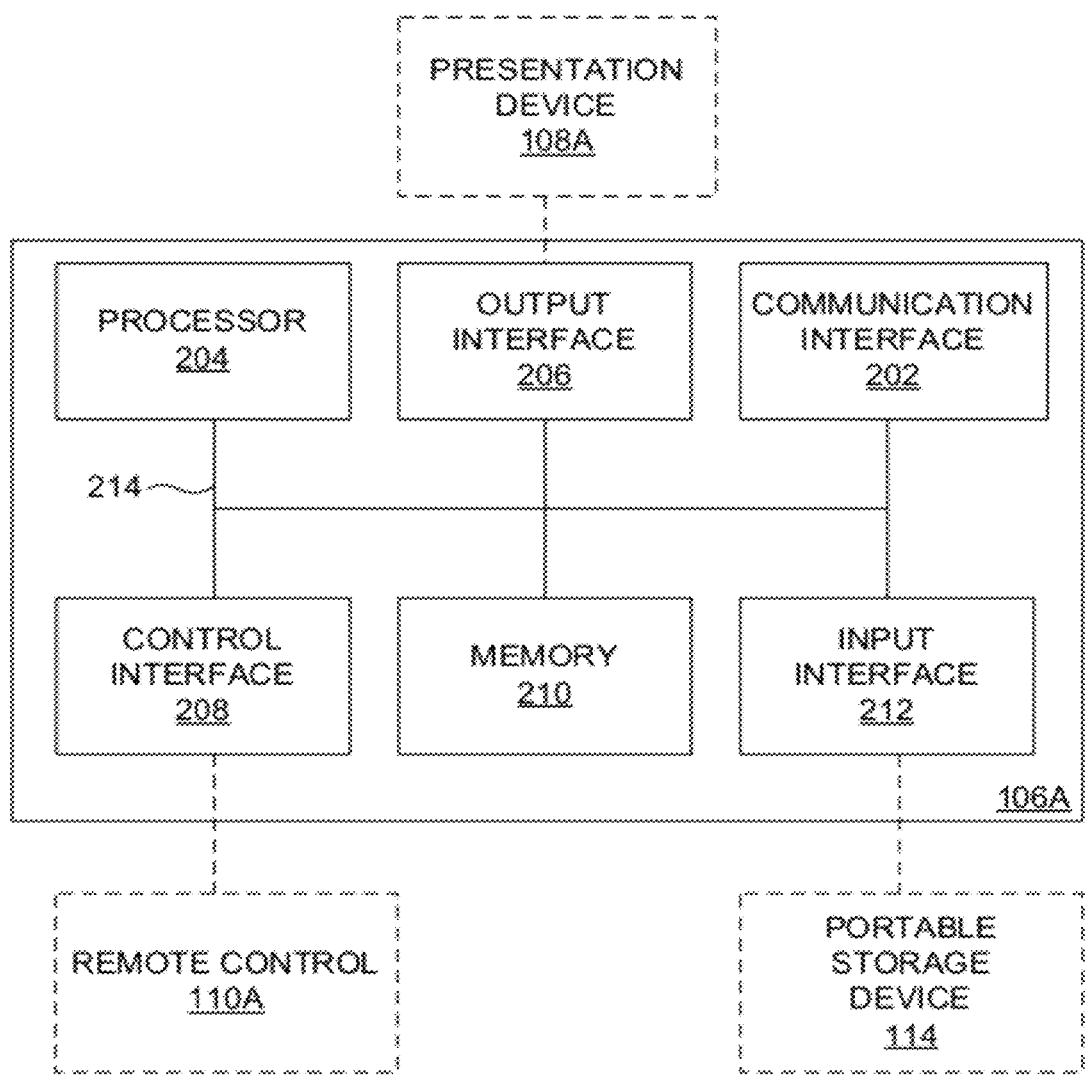
FIG. 2 illustrates an embodiment of a television receiver of FIG. 1.

FIG. 2 illustrates an embodiment of a television receiver 106A of FIG. 1. The television receiver 106A includes a communication interface 202, a processor 204, an output interface 206, a control interface 208, a memory 210 and an input interface 212. The components of the television receiver 106A may be communicatively coupled together by one or more data buses 214 or other type of data connections. The television receiver 106A may include other components, elements or devices not illustrated for the sake of brevity. It is to be appreciated that in at least one embodiment, the television receiver 106B (see FIG. 1) may be configured similarly to the television receiver 106A.

The communication interface 202 is operable to receive content and other data from the television distribution system 104. More particularly, in at least one embodiment, the communication interface 202 receives and tunes a television signal including television programming. The communication interface 202 may receive an over-the-air (OTA) broadcast, a direct broadcast satellite signal, a cable television signal or an IPTV signal and tune the content to extract the selected television programming. In at least one embodiment, the communication interface 202 may comprise multiple tuners, utilized by the television receiver 106A to output and/or record multiple television programs simultaneously.

The processor 204 is operable for controlling the operation of the television receiver 106A. As used herein, processor 204 refers to a single processing device or a group of inter-operational processing devices. The operation of processor 204 may be controlled by instructions executable by processor 204. Some examples of instructions are software, program code and firmware. Various embodiments of processor 204 include any sort of microcontroller or microprocessor executing any form of software code. The processor 204 controls the reception of data/content by the communication interface 202 and the output of video content by the output interface 206. In at least one embodiment, the processor 204 is operable to generate content selection menus, such as electronic programming guide menus, for presentation by the presentation device 108A.

The processor 204 is communicatively coupled to the memory 210, which is operable to store data during operation of the processor 204. Such data may include software and firmware executed by the processor 204 as well as system and/or program data generated during the operation of the processor 204. Memory 210 may comprise any sort of digital memory (including any sort of read only memory (ROM), RAM, flash memory and/or the like) or any combination of the aforementioned.

In at least one embodiment, the memory 210 may comprise authorization information, indicating the particular program for which the television receiver 106A is authorized to output to the presentation device 108A. For example, the authorization information may specify particular channels that are authorized for output by the television receiver 106A. The authorization information may also specify particular programming that the television receiver 106A is entitled to output, such as pay-per-view (PPV) movies, video-on-demand content and the like. In at least one embodiment, the authorization information is received from the content source 102 through the television distribution network 104.

In at least one embodiment, the television receiver 106A optionally includes a storage medium (not shown in FIG. 2) operable to persistently store video signals recorded by the television receiver 106A. The storage medium may comprise any type of non-volatile memory appropriate for storing video signals recorded by the television receiver 106A. Exemplary storage mediums include hard drives (e.g., magnetic memory), flash memory, battery backed up memory and the like. In at least one embodiment, the storage medium may be internally located within the television receiver 106A. In other embodiments, the storage medium may be located external with respect to the television receiver 106A. The television receiver 106A may also utilize a combination of internal and external storage mediums for storage of video signals. In a recording mode, the processor 204 is operable to control the reception of content by the output interface 206 and storage of the content onto the storage medium. The processor 204 may then generate content selection menus allowing the user 112 to select recorded content for playback via the presentation device 108A.

The television receiver 106A also includes an output interface 206 operable to interface with the presentation device 108A. More particularly, the output interface 206 is operable to output information for presentation by the presentation device 108A (see FIG. 1). The output interface 206 may be operable to output any type of presentation data to the presentation device 108A, including audio data, video data, audio/video (A/V) data, textual data, imagery or the like. In other embodiments, the output interface 206 may comprise a network interface operable to transmit data to other components, devices or elements, such as other computers, servers and the like. The output interface 206 may receive data from the processor 204 and/or other components of the television receiver 106A for output to the presentation device 108A (see FIG. 1).

The control interface 208 is operable to interface with one or more input devices, such as the remote control 110A (see FIG. 1). The input device may comprise any type of device for inputting data to the television receiver 106A. More particularly, data received from the input device may be used to control the operation of the processor 204 and/or the output of data to the presentation device 108A. The control interface 208 and the remote control 110A may be communicatively coupled using any type of wired or wireless connection, including USB, WiFi, infrared and the like. In some embodiments, the control interface 208 may comprise a wireless receiver for receiving any type of RF or IR communication from the remote control 110A.

The input interface 212 is operable to interface with the portable storage device 114. Responsive to commands from the processor 204, the input interface 212 operates to access data stored on the portable storage device 114 and/or initiate storage of data onto the portable storage device 114. For example, the portable storage device 114 may comprise a USB hardware key and the input interface 212 may be operable to interface with the USB hardware key to request access to data stored thereupon. In at least one embodiment, data stored on the portable storage device 114 may include authorization information for accessing particular content, features, applications and the like of the television receiver 106A. In some embodiments, data stored on the portable storage device 114 may include software applications for operation on a television receiver 106A-106B as well as audio content, video content, audio/video content, images and the like that may be presented by a television receiver 106A or 106B.

Storage of Data onto the Portable Storage Device

In at least one embodiment, the television receiver 106A is operable to initiate storage of authorization information onto the portable storage device 114. For example, the television receiver 106A may be associated as the home receiver for the portable storage device 114 and may synchronize the authorization information stored in the memory 210 with the authorization information stored in the portable storage device 114. In at least one embodiment, the portable storage device 114 may be associated with a single television receiver 106A-106B at any particular time. In other words, the portable storage device 114 may store authorization information for a single television receiver 106A-106B at any particular time, preventing a user from storing authorization information for multiple television receivers 106A-106B simultaneously on the portable storage device 114. The synchronization process may involve adding, deleting and/or updating the authorization information stored on the portable storage device 114, depending on modifications to the authorization information in memory 210 since the portable storage device 114 was last synchronized with the same.

In at least one embodiment, the authorization information stored on the portable storage device 114 may minor the authorization information stored in the memory 210. In other words, the processor 204 may operate to initiate copying of the authorization information from the memory 210 to the portable storage device 114. In some embodiments, the authorization information stored on the portable storage device 114 may be a subset of the authorization information stored in memory 210. For example, the portable storage device 114 may store authorization information for specific content, e.g., PPV events or premium channels and may omit authorization information for other content, e.g., basic subscriber channels.

In at least one embodiment, the synchronization between the memory 210 and the portable storage device 114 is performed automatically when the portable storage device 114 is communicatively coupled to the input interface 212. In other words, the processor 204 operates to control modification of the authorization information stored on the portable storage device 114 when the user 112 connects the portable storage device 114 to the television receiver 106A. It is to be appreciated that a synchronization process may also be performed by the television receiver 106A responsive to a request by the user 112. For example, the user 112 may utilize a menu output by the television receiver 106A to request synchronization of the television receiver 106A with the portable storage device 114. In at least one embodiment, a user 112 may select which authorization information to store on the portable storage device 114. For example, the user 112 may select authorization information, corresponding to particular content, for storage onto the portable storage device 114.

In addition to authorization information for content, the portable storage device 114 may also store authorization information for features of the television receiver 106A. For example, the portable storage device 114 may store authorization information for software applications capable of operating on the television receivers 106A-106B. A user 112 may then request to execute a software application on the television receiver 106A, the software application license being associated with another television receiver 106B. Games, video editing software and messaging software are some examples of software applications usable through the television receiver 106A. In at least one embodiment, the portable storage device 114 may store the software application which may then be transferred from one television receiver 106A to another. The portable storage device 114 may also store videos, pictures and other data which may be transferred from the television receiver 106A to another television receiver 106B. If the portable storage device 114 stores other data, such as applications, audio content, video content, audio/video content, images or the like, then the user 112 may identify the data for storage onto the portable storage device 114 using a menu of the television receiver 106A.

In at least one embodiment, data stored on the portable storage device 114 may be stored in an encrypted format. Thus, authorized access and modification of the data stored on the portable storage device 114 becomes more difficult. In at least one embodiment, the portable storage device 114 may include hardware components configured to restrict access and/or modification of the data stored thereupon to specific devices and/or software applications. For example, the processor 204 may provide authentication credentials to the portable storage device 114, via the processor 204, allowing the television receiver 106A access to data stored on the portable storage device 114.

Retrieval of Data from the Portable Storage Device

Once data is stored onto the portable storage device 114 by a television receiver 106A-106B, the data may be utilized by other television receivers 106A-106B to authorize access by users 112 to particular content. For example, the portable storage device 114 may store authorization information for content authorized for output by the television receiver 106B. The portable storage device 114 may be connected to the input interface 212 and the input interface 212 may access the authorization information stored thereupon.

In at least one embodiment, the processor 204 processes the authorization information stored on the portable storage device 114 to determine which content to allow the user 112 to access through the television receiver 106A. The authorization information stored on the portable storage device 114 may be utilized to supplement authorization information stored in the memory 210. Thus, if the television receiver 106A is not authorized to output particular content, but the authorization information stored on the portable storage device 114 indicates authorization for the content, then the processor 204 may operate to output the content while the portable storage device 114 is connected to the television receiver 106A.

In at least one embodiment, the processor 204 may receive input, via the control interface 208, requesting to access particular content. The processor 204 accesses first authorization information stored in the memory 210 to determine whether the content is authorized for output by the television receiver 106A. If the processor 204 is not entitled to output the content based on the authorization information stored in the memory 210, then the processor 204 accesses second authorization information stored on the portable storage device 114 to determine whether output of the content is authorized. If the second authorization information indicates that the processor 204 is entitled to output the content, then the processor 204 operates to control the output of the content by the output interface 206 to the presentation device 108A.

For example, the television receiver 106A may receive the television channels illustrated in Table #1. Table #1 further illustrates the particular channels authorized for output by the television receiver 106A as well the particular channels authorized for output by the television receiver 106B. The authorization information for the channels authorized on the television receiver 106A are stored in the memory 210 and the authorization information for the channels authorized on the television receiver 106B are stored on the portable storage device 114.

TABLE #1

Authorized Channels for Each Television Receiver

| Channel | Television Receiver 106A | Television Receiver 106B |
|---------|--------------------------|--------------------------|
| 2 | Y | Y |
| 3 | Y | Y |
| 4 | N | Y |
| 5 | Y | Y |
| 6 | N | Y |

TABLE #1-continued

Authorized Channels for Each Television Receiver

| Channel | Television Receiver 106A | Television Receiver 106B |
|---------|--------------------------|--------------------------|
| 7 | N | N |
| 8 | Y | Y |

As illustrated in Table #1, the television receiver 106A is entitled to access channels 2, 3, 5 and 8 and is not entitled to access channels 4, 6 and 7. The authorization information for channels 2, 3, 5 and 8 is stored in the memory 210. The television receiver 106B is additionally entitled to access channels 4 and 6, but is also not entitled to access channel 7. The authorization information for channels accessible by the television receiver 106B is stored on the portable storage device.

When a user 112 requests to access channels 2, 3, 5 and 8, the processor 204 retrieves and verifies the authorization information in memory 210 and outputs the content requested by the user 112. If the user 112 requests to access channels 4 or 6, then the processor 204 is not entitled to output the content based on the information stored in the memory 210. However, the processor 204 initiates retrieval of the authorization information from the portable storage device and verifies that output of the content is authorized. The processor 204 then initiates output of one of the requested channels 4 or 6. If the user 112 requests to access channel 7, the processor 204 checks both the first authorization information stored in the memory 210 and the second authorization information stored on the portable storage device 114. Since neither set of authorization information entitles the television receiver 106A to output the request channel, the processor 204 does not output the content for channel 7.

In at least one embodiment, the processor 204 may retrieve authorization information from the portable storage device 114 and modify an access matrix or database stored in memory 210. The access matrix indicates the temporary entitlement by the television receiver 106A to output particular content specified by the authorization information on the portable storage device 114. If the portable storage device 114 is subsequently removed, then the processor 204 updates the matrix or database to indicate that the television receiver 106A is no longer entitled to access the content specified on the portable storage device 114. In at least one embodiment, the processor 204 may be configured to periodically query the portable storage device 114 to verify that the device 114 is still communicatively coupled to the input interface 212. The input interface 212 may also be operable to detect when the portable storage device 114 is disconnected and may notify the processor 204 accordingly.

Software Applications

As described above, the portable storage device 114 may be operable to store authorization information for accessing software applications executable by the television receiver 106A. For example, the television receiver 106A may store various software applications on a storage medium for access by the user 112. However, the applications may not be accessible unless the user 112 has purchased the proper licensing. In at least one embodiment, the user 112 requests to access one of the applications through a menu generated by the processor 204. The processor 204 checks the memory 210 and the portable storage device 114 to identify whether to authorize execution of the software application. If proper authorization information is located on the portable storage device 114, then the processor 204 authorizes execution of the software application.

In at least one embodiment, software applications, as well as any associated authorization information, may both be stored on the portable storage device 114. When the portable storage device 114 is connected to the input interface 212, the processor 204 may output a menu allowing the user 112 to select a software application for execution. The processor 204 then accesses the software application file on the portable storage device 114 for execution.

Content Stored on the Portable Storage Device

In at least one embodiment, the portable storage device 114 may store various types of content for presentation by the television receiver 106. For example, audio content, video content, audio/video content, images, e-books and the like may be stored on the portable storage device 114. The processor 204 may access the data stored on the portable storage device 114 and output any content for presentation by the presentation device 108A. In at least one embodiment, content may be stored on the portable storage device 114 in an encrypted format and the processor 204 may be operable to decrypt the content stored on portable storage device 114.

In some situations, content stored on the portable storage device 114 may have access restrictions placed thereupon. Thus, there may be authorization information which allows access to the content stored on the portable storage device 114. The authorization information may be stored on the portable storage device 114 and accessed by the processor 204 responsive to a request to access the content. If the processor 204 verifies the authorization information, then the output interface 206 operates to output the content stored on the portable storage device 114 for presentation by the presentation device 108A.

Figure 3:
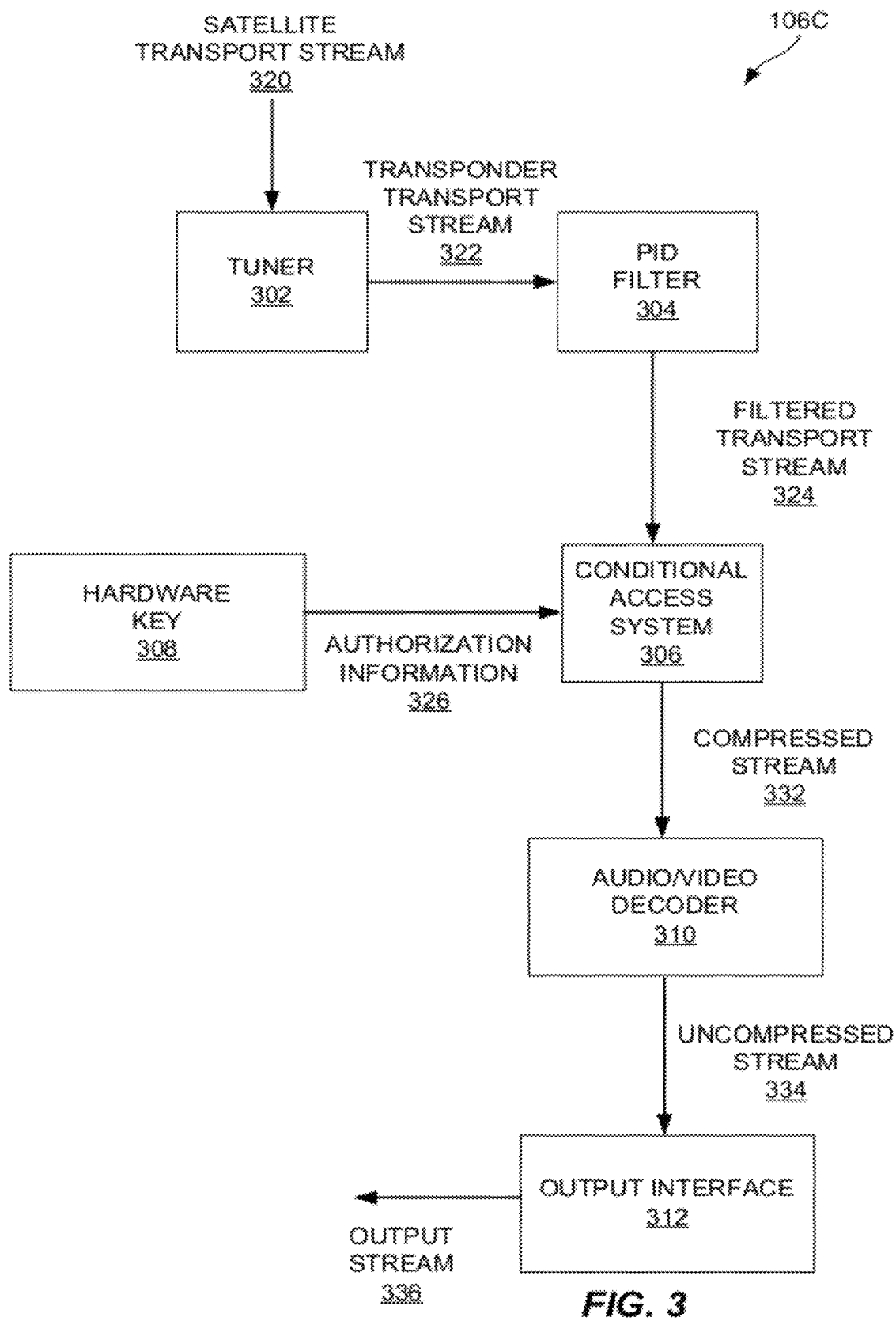
FIG. 3 illustrates a block diagram of an embodiment of a television receiver of FIG. 1.

FIG. 3 illustrates a block diagram of an embodiment of a television receiver of FIG. 1. FIG. 3 will be discussed in reference to the communication network 100 illustrated in FIG. 1. The television receiver 106C will be described in the context of a satellite television receiver. However, it is to be appreciated that the techniques described herein may be applied to other types of television receivers. The television receiver 106C includes a tuner 302, a program identifier (PID) filter 304, a conditional access system 306, a hardware key 308, an audio/video decoder 310 and an output interface 312. Each of these components is discussed in greater detail below. The television receiver 106C may include other components, elements or devices not illustrated for the sake of brevity.

The tuner 302 is operable to receive a satellite transport stream 320 from the content source 102 (see FIG. 1). More particularly, the satellite transport stream 320 includes data associated with multiple transponders of the television distribution system 104. The user 112 provides input to the television receiver 106C requesting to view a particular television channel. For example, the user 112 may select a channel for viewing using a remote control 110A associated with the television receiver 106C. The tuner 302 is operable to identify a transponder carrying the selected channel and extract data associated with the particular transponder to generate a transponder transport stream 322. In at least one embodiment, the television receiver 106C may comprise multiple tuners utilized to tune multiple television programs carried on multiple transponders of the television distribution network 104 simultaneously.

The transponder transport stream 322 may include programming associated with a plurality of channels of a television provider as well as other data, such as electronic programming guide data. For example, the transport stream may include programming from a sports channel, a movie channel and a news channel, electronic programming guide data, entitlement control messages (ECMs) and entitlement management messages (EMMs) multiplexed together. In at least one embodiment, the audio/video content in the transponder transport stream 322 is received in a compressed format, e.g., MPEG-2 or MPEG-4 format. Portions of the data in the transponder transport stream 322 may be encrypted while other portions of the transponder transport stream 322 may be unencrypted. The various components within the transponder transport stream 322 may be identified by unique PIDs. For example, video data associated with the sports channel may be associated with a first PID and audio data associated with the sports channel may be associated with a second PID. Similarly, control words utilized to decrypt the content may be associated with a third PID of the transport stream.

In at least one embodiment, the tuner 302 transmits the transponder transport stream 322 to the PID filter 304. The PID filter 304 is operable to extract the PID streams associated with a particular channel selected for viewing by the user 112 to generate the filtered transport stream 324. The PID filter 304 provides a filtered transport stream 324, including selected PIDs, to the conditional access system 306 for decryption of the encrypted audio/video content contained therein. For example the PID filter may extract programming associated with a selected channel (e.g., a movie channel or a sports channel) from the transponder transport stream 322 to generate the filtered transport stream 324. In at least one embodiment, the transponder transport stream 322 includes unencrypted portions and the tuner 302 may also be communicatively coupled to the audio/video decoder 310 to provide the transponder transport stream 322 to the audio/video decoder 310.

In at least one embodiment, the conditional access system 306 is operable to interface with the smart card (not shown in FIG. 3) to decrypt the filtered transport stream 324. The filtered transport stream 324 may include encrypted audio/video content (e.g., audio and video data associated with a particular program) as well as encrypted key information used to decrypt the audio/video stream. In some embodiments, video data may be encrypted while the audio data is unencrypted. Thus, in at least one embodiment, the filtered transport stream 324 includes encrypted video data but not audio data. The encrypted key information may include for example ECMs and EMMs, which are utilized to decrypt the encrypted audio/video stream in the filtered transport stream 324. An EMM is related to the authorization of services by the content provider. Essentially, an EMM authorizes a particular television receiver 106C or a particular group of television receivers 106C, such as a particular geographic region, to access specified services (e.g., particular television programming). The EMM and ECM are utilized to derive control words, which are utilized as input for decryption selected audio/video content. The EMM and the ECM may be updated as appropriate by the operator of the television distribution system 104 depending on desired design criteria.

The conditional access system 306 is operable to interface with the hardware key 308, which stores authorization information 326 related to another television receiver, such as the television receiver 106B (see FIG. 1). The conditional access system 306 is communicatively coupled to the hardware key 308 through appropriate interface hardware, such as a USB interface. In at least one embodiment, the conditional access system 306 includes a socket for receiving the hardware key 308. The hardware key 308 may provide authorization information 326, such as entitlement messages or decryption keys, to the conditional access system 306 for further processing. The conditional access system 306 utilizes the authorization information to authorize access to portions of the filtered transport stream 324 requested by the user 112. For example, the conditional access system 306 may utilize the authorization information 326 received from the hardware key 308 to decrypt information within EMMs and the ECMs to derive a control word, which is a key for descrambling the encrypted audio/video content in the filtered transport stream 324.

The decryption process yields unencrypted audio/video content, such as the compressed stream 332. The conditional access system 306 outputs the compressed audio/video stream 332 to the audio/video decoder 310 for further processing. In at least one embodiment, other components, such as a transport stream multiplexer, may combine multiple inputs, such as the transponder transport stream 322 and the compressed stream 332 for input to the audio/video decoder 310.

The audio/video decoder 310 is operable to receive the compressed stream 332 and decode the associated content to generate the uncompressed stream 334. In at least one embodiment, the audio/video decoder 310 may comprise multiple components, such as an audio decoder and a video decoder which receive separate inputs and provide separate uncompressed output components, e.g., audio and video components, depending on desired design criteria. The output interface 312 receives the uncompressed stream 334 and converts the audio and video components into an appropriate format for output to the presentation device 108. In at least one embodiment, the output interface 312 is embodied as a modulator that modulates the output stream 336 into one or more audio/video formats. The output interface 312 may incorporate circuitry to output the output stream 336 in any format recognizable by the presentation device 108, including composite video, component video, RF modulation, internet protocol (IP) streaming, SCART, Digital Visual Interface (DVI) and High-Definition Multimedia Interface (HDMI).

Figure 4:
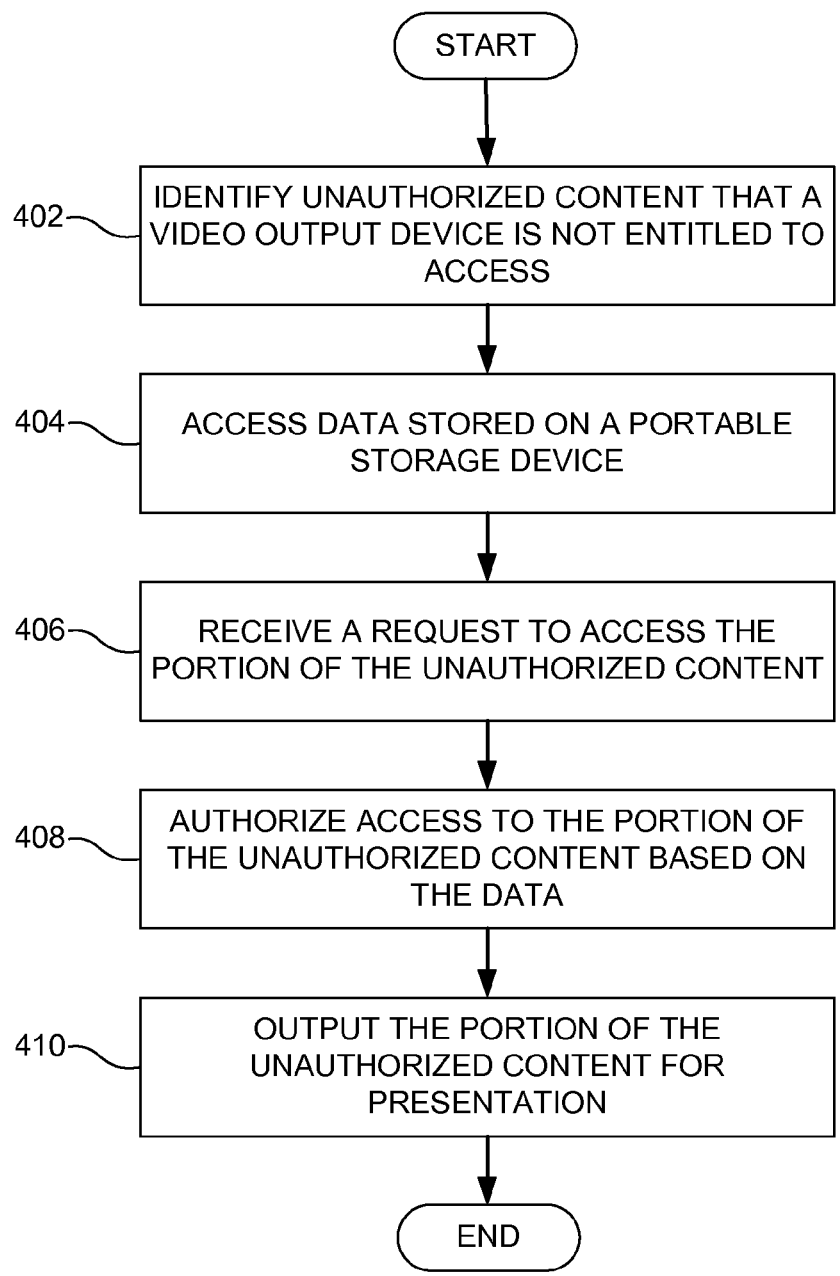
FIG. 4 illustrates an embodiment of a process for operating a video output device.

FIG. 4 illustrates an embodiment of a process for operating a video output device. Particular, the process of FIG. 4 is directed at transferring authorization information for particular content from one television receiver to another television receiver. The process of FIG. 4 may include other operations not illustrated for the sake of brevity.

The process includes identifying, in a conditional access module of a first video output device, unauthorized content that the video output device is not entitled to access (operation 402). For example, the video output device may store first authorization information specifying content that the video output device is authorized to output. The video output device may not be authorized to output particular channels, PPV content, VOD content accessed through an external server or stored locally on the video output device.

The process further includes accessing data, stored on a portable storage device communicatively coupled to the first video output device (operation 404). The data specifies at least a portion of the unauthorized content that is authorized for output by a second video output device. The data may be second authorization information, licensing information, decryption keys, entitlement messages or the like. The video output device may then build a temporary authorization matrix, database or the like that specifies the content that the user may select for viewing. In at least one embodiment, the authorization matrix may be utilized to generate content selection menus for output to a user. In at least one embodiment, the temporary authorization matrix is valid as long as the portable storage device remains connected to the video output device. If the portable storage device is disconnected from the video output device, then the authorization matrix may be modified based on the removal of the access parameters specified in the second authorization information.

The process further includes receiving a request, at the first video output device, to access the portion of the unauthorized content (operation 406). For example, the user may request to access a VOD movie accessible through an external server, using a video content selection menu. The VOD movie may not have been purchased through the first video output device and thus may not be associated with the first video output device. However, the movie may have been purchased using the second video output device and may be associated therewith. The process further includes authorizing access to the portion of the unauthorized content based on the data (e.g., the second authorization information) (operation 408) and outputting the portion of the unauthorized content for presentation by a presentation device (operation 410).

Although specific embodiments were described herein, the scope of the invention is not limited to those specific embodiments. The scope of the invention is defined by the following claims and any equivalents therein.

What is claimed is:

1. A television receiver comprising:
   a network interface that receives programming from a television network;
   a input interface that receives a portable storage device, the portable storage device storing data specifying a portion of the programming authorized for output by a second television receiver; and
   a processor operable to determine that the television receiver is not authorized to output at least part of the programming in response to a request from a user for the at least part of the programming,
   access the data stored on the portable storage device in response to determining that the television receiver is not authorized to output the at least part of the programming,
   identify the at least part of the programming authorized for viewing on the second television receiver based on the accessed data,
   and output the at least part of the programming for presentation by a presentation device responsive to identifying that the at least part of the programming is authorized for viewing on the second television receiver.

2. The television receiver of claim 1, wherein the input interface comprises a universal serial bus (USB) port configured to receive the portable storage device.

3. The television receiver of claim 1, wherein the data specifies at least one channel of the programming that the second television receiver is authorized to output.

4. The television receiver of claim 1, wherein the data specifies a pay-per-view program that the second television receiver is authorized to output.

5. The television receiver of claim 1, wherein the data specifies a video-on-demand program that the second television receiver is authorized to output.

6. The television receiver of claim 1, wherein the data specifies a software application authorized to operate on the second television receiver, and wherein the processor authorizes execution of the software application based on the data.

7. The television receiver of claim 6, wherein the software application is stored on the portable storage device.

8. A television receiver comprising:
   a network interface that receives programming from a television distribution network, the programming including authorized content that the television receiver is authorized to output and unauthorized content that the television receiver is not authorized to output;
   a storage medium, within the television receiver, that stores first authorization information identifying the authorized content;
   an input interface that receives a portable storage device, the portable storage device including second authorization information for a portion of the programming authorized for output by a second television receiver; and
   a processor that receives user input requesting to output the unauthorized content,
   determines, based on the first authorization information, that the television receiver is not authorized to output the unauthorized content,
   accesses the second authorization information stored on the portable storage device,
   determines whether the unauthorized content corresponds with the portion of the programming authorized for output by the second television receiver, and
   outputs the unauthorized content for presentation by a presentation device responsive to determining that the unauthorized content is authorized on the second television receiver.

9. The television receiver of claim 8, wherein the input interface receives a second portable storage device and the processor is operable to initiate storage of data corresponding with the first authorization information onto the second portable storage device.

10. The television receiver of claim 8, wherein the input interface comprises a universal serial bus (USB) port configured to receive the portable storage device.

11. The television receiver of claim 8, wherein the data specifies a software application authorized to operate on the second television receiver, and wherein the processor authorizes execution of the software application based on the data.

12. The television receiver of claim 11, wherein the software application is stored on the portable storage device.

13. A method of operating a video output device, the method comprising:
   receiving a request, at the first video output device, to access a portion of unauthorized content;
   identifying, in a conditional access module of a first video output device, the portion of unauthorized content that the first video output device is not entitled to access;
   in response to identifying the portion of unauthorized content, accessing data stored on a portable device communicatively coupled to the first video output device, the data specifying the portion of unauthorized content that is authorized for output by a second video output device;
   authorizing access to the portion of unauthorized content based on the accessed data; and
   outputting the portion of unauthorized content for presentation by a presentation device coupled to the first video output device.

14. The method of claim 13, wherein accessing the data further comprises: accessing the data, on the portable storage device, through a universal serial bus (USB) port configured to interface the portable storage device with the first video output device.

15. The method of claim 13, wherein the first and second video output devices comprise television receivers and wherein the unauthorized content comprises video content received by the first and second video output devices from a television distribution network.

16. The method of claim 15, wherein the video content comprises at least one channel distributed through the television distribution network.

17. The method of claim 15, wherein the video content comprises a pay-per-view program distributed through the television distribution network.

18. The method of claim 15, wherein the video content comprises video on demand content distributed through the television distribution network.

19. The method of claim 13, wherein the unauthorized content comprises at least one software application executable by the first and second video output devices and the data comprises an authorization to execute the software application.

20. The method of claim 19, wherein the software application is stored on the portable storage device.

* * * * *